United States Patent
Engeldinger et al.

(10) Patent No.: US 12,006,436 B2
(45) Date of Patent: Jun. 11, 2024

(54) RUBBER COMPOSITION AND A TIRE

(71) Applicant: The Goodyear Tire & Rubber Company, Akron, OH (US)

(72) Inventors: Eric Engeldinger, Redange/Attert (LU); Manuela Pompei, Reuler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 99 days.

(21) Appl. No.: 17/475,488

(22) Filed: Sep. 15, 2021

(65) Prior Publication Data

US 2022/0153968 A1    May 19, 2022

Related U.S. Application Data

(60) Provisional application No. 63/113,538, filed on Nov. 13, 2020.

(51) Int. Cl.
| | |
|---|---|
| *C08L 9/06* | (2006.01) |
| *B60C 1/00* | (2006.01) |
| *C08F 8/04* | (2006.01) |
| *C08F 32/06* | (2006.01) |
| *C08K 3/36* | (2006.01) |
| *C08K 5/00* | (2006.01) |
| *C08K 5/40* | (2006.01) |
| *C08L 15/00* | (2006.01) |
| *C08C 19/02* | (2006.01) |

(52) U.S. Cl.
CPC ................ *C08L 9/06* (2013.01); *B60C 1/00* (2013.01); *C08F 8/04* (2013.01); *C08F 32/06* (2013.01); *C08K 3/36* (2013.01); *C08K 5/0016* (2013.01); *C08K 5/0025* (2013.01); *C08K 5/40* (2013.01); *C08L 15/00* (2013.01); *C08C 19/02* (2013.01)

(58) Field of Classification Search
CPC .. C08L 9/06; C08L 15/00; C08L 45/00; C08L 23/20; C08L 91/00; C08L 65/00; C08L 91/06; B60C 1/00; C08F 8/04; C08F 32/06; C08K 5/0016; C08K 5/0025; C08K 5/40; C08K 3/36; C08K 5/09; C08K 5/548; C08K 3/22; C08K 3/06; C08K 3/04; C08K 5/31; C08K 5/47; C08C 19/02

See application file for complete search history.

(56) References Cited

U.S. PATENT DOCUMENTS

| | | | |
|---|---|---|---|
| 7,629,409 B2 | 12/2009 | Kanz et al. | |
| 10,266,008 B2 | 4/2019 | Miyazaki | |
| 11,118,036 B2 | 9/2021 | Isitman et al. | |
| 2004/0242797 A1* | 12/2004 | Stere | C08C 19/02 525/333.2 |
| 2008/0156404 A1* | 7/2008 | Brunelet | C08K 5/0008 524/68 |
| 2012/0115984 A1* | 5/2012 | Pialot | B60C 5/14 523/351 |
| 2017/0145195 A1* | 5/2017 | Isitman | C08K 3/36 |
| 2017/0226233 A1* | 8/2017 | Yamashiro | B60C 1/0016 |
| 2017/0232795 A1 | 8/2017 | Isitman et al. | |
| 2017/0240731 A1* | 8/2017 | Yamashiro | B60C 1/00 |
| 2020/0024432 A1* | 1/2020 | Kitaura | C08L 45/00 |
| 2021/0139678 A1 | 5/2021 | Engeldinger | |

FOREIGN PATENT DOCUMENTS

| | | | | |
|---|---|---|---|---|
| CA | 3017422 | | 10/2017 | |
| FR | 2 900 211 | * | 11/2013 | |
| JP | 1 902 865 | * | 9/2007 | |
| JP | 2011213766 A | * | 10/2011 | |
| JP | 2020105377 A | | 7/2020 | |
| WO | WO 2017/165499 | * | 9/2017 | |
| WO | WO-2018190427 A1 | * | 10/2018 | B60C 1/00 |

OTHER PUBLICATIONS

Machine translation of FR 2990211 (Year: 2013).*
Machine translation of JP-2011213766-A (Year: 2011).*
Extended European Search Report for European Patent Application 21207401.7 dated Mar. 16, 2022 which is a counterpart of the subject patent application.
Chinese Office Action dated Mar. 23, 2023 for Chinese Patent Application No. 202113388216.5.

* cited by examiner

Primary Examiner — Doris L Lee
(74) Attorney, Agent, or Firm — Alvin T. Rockhill

(57) ABSTRACT

The present invention is directed to a sulfur vulcanizable rubber formulation comprising 10 phr to 100 phr of at least one partially saturated elastomer comprising repeat units, wherein at most 10% of all repeat units of the elastomer comprise a double bond; 0 phr to 90 phr of at least one diene based elastomer; 40 phr to 200 phr of at least one filler; and 5 phr to 70 phr of at least one hydrogenated plasticizer. This sulfur vulcanizable rubber formulation has been found to be useful in manufacturing tires.

19 Claims, No Drawings

RUBBER COMPOSITION AND A TIRE

This application claims benefit of U.S. Provisional Patent Application Ser. No. 63/113,538, filed on Nov. 13, 2020. The teachings of U.S. Provisional Patent Application Ser. No. 63/113,538 are incorporated herein by reference in their entirety.

FIELD OF THE INVENTION

This invention relates to a rubber composition which is particularly beneficial for use in tires, such as in one or more of the rubber components in such tires. Moreover, the present invention is directed rubber formulations, to tires which include such rubber formulations, and to components of tires made with such rubber formulations.

BACKGROUND OF THE INVENTION

In view of a continuing demand for improved tire performance, new material combinations are constantly being evaluated and tested by tire manufacturers. In particular, in many tire tread rubber compositions, it is difficult to break the tradeoff between hysteresis and tear. While it may be possible to obtain good tensile and/or tear properties while maintain good rolling resistance (a low level of hysteresis), it is typically difficult to obtain these objectives while maintaining acceptable wet performance characteristics. There accordingly remains to be a long felt need for improved tire rubber formulations which provide good wet traction tear resistance, and rolling resistance properties. It is also, of course, desirable for abrasion resistance to be maintained at a reasonable level.

SUMMARY OF THE INVENTION

A first object of the present invention may be to provide a rubber composition having desirable rolling resistance and/or hysteresis properties.

Another object of the present invention may be to provide a rubber composition having good tensile properties and/or advanced durability and wear resistance.

Another object of the present invention may be to provide a rubber composition with desirable wet performance indicators.

Yet another object of the present invention may be to provide a rubber composition exhibiting a good compromise of hysteresis properties, tensile properties and wet performance.

Thus, in a first aspect of the invention, the present invention is directed to a sulfur vulcanizable rubber composition comprising 10 phr to 100 phr (preferably 50 phr to 100 phr) of at least one partially saturated (or in other words unsaturated) elastomer comprising a plurality of repeat units, wherein at most 15% of all repeat units of the elastomer comprise a double bond; 0 phr to 90 phr of at least one diene based elastomer (preferably 0 phr to 50 phr); 40 phr to 200 phr of at least one filler; and 5 phr to 70 phr of at least one hydrogenated plasticizer.

It has been found by the inventors that the combination of the partially saturated elastomer with a hydrogenated plasticizer may offer on the one hand good rolling resistance and hysteresis properties and, on the other hand, good wet performance. Abrasion and tear strength are also provided at a high level.

In one embodiment, hydrogenated plasticizers are chosen from one or more of hydrogenated liquid plasticizers and hydrogenated hydrocarbon resins. In particular, hydrogenated liquid plasticizers could include hydrogenated oils and/or hydrogenated liquid polymers, preferably hydrogenated liquid diene-based polymers. Such hydrogenated liquid and diene-based polymers have preferably an average molecular weight Mw of less than 50,000 g/mol, wherein Mw is determined with gel permeation chromatography (GPC) using polystyrene calibration standards according to ASTM 5296-11 or equivalent. Liquid diene-based polymers could include liquid styrene-butadiene rubbers, butadiene rubbers, isoprene rubbers, styrene isoprene rubbers, isoprene butadiene rubbers and styrene isoprene butadiene rubbers, or combinations thereof.

In an embodiment, the hydrogenated hydrocarbon resin is selected from fully or partially hydrogenated C9 resins (resins containing 9 carbon atoms), fully or partially hydrogenated C5 resins (resins containing 5 carbon atoms), fully or partially hydrogenated alpha methyl styrene resins, fully or partially hydrogenated terpene resins, fully or partially hydrogenated rosin resins, or mixtures thereof. It is also possible that the resin is modified by one or more aliphatic or aromatic groups.

In another embodiment, the hydrogenated hydrocarbon resin is selected from the group of fully or partially hydrogenated (in particular aliphatic) C5 resins, fully or partially hydrogenated cyclopentadiene resins, fully or partially hydrogenated dicyclopentadiene resins, and combinations of those. It is also possible that the resin is modified by one or more aliphatic or aromatic groups. However, the majority of the monomer residues of the resin are preferably partially or fully hydrogenated cyclopentadienes, fully or partially hydrogenated dicyclopentadienes, and combinations of those.

In another embodiment, the hydrogenated hydrocarbon resin is a fully or partially hydrogenated cyclopentadiene resin, fully or partially hydrogenated dicyclopentadiene, or a combination thereof.

In another embodiment, a glass transition temperature (Tg) of the resin is within a range of 30° C. to 80° C., preferably 40° C. to 80° C., or even more preferably within a range of 40° C. to 70° C. A glass transition temperature of a resin is determined herein as a peak midpoint by a differential scanning calorimeter (DSC) at a temperature rate of increase of 10° C. per minute, according to ASTM D6604 or equivalent.

In another embodiment, the resin has a softening point of at least 95° C. as determined according to ASTM E28, or equivalent, which might sometimes be referred to as a ring and ball softening point. Preferably, the softening point is at most 140° C. or more preferably at most 120° C., or even more preferably at most 110° C.

In still another embodiment, the resin has a polydispersity index within a range of 1 to 5, preferably 1 to 2, or even more preferably 1.5 to 1.8.

In yet another embodiment, the resin has an average molecular weight (Mw) within a range of 150 g/mol to 1500 g/mol, preferably 400 g/mol to 1000 g/mol, or more preferably 500 g/mol to 900 g/mol, or even more preferably 600 g/mol to less than 700 g/mol. Molecular weight is determined by gel permeation chromatography (GPC) using polystyrene calibration standards according to ASTM 5296-11 or its equivalent.

In another embodiment, at most 15%, preferably at most 10%, or even more preferably at most 8% of all repeat units have a double bond. Alternatively or in addition, at least 2%, preferably at least 4%, of the repeat units have a double bond. In particular, it may be less desirable that the elastomer is fully free of double bonds or completely hydrogenated. In particular, some of the double bonds (typically originating from a double bond of a monomer unit) shall remain in place for the purpose of cross linking. When counting double bonds in this application, the bonds in an aromatic structure or group, such as of a styrene repeat unit, are not counted as double bond. However, a styrene unit is still counted as a repeat unit for the determination of the total number of repeat units in the polymer or elastomer.

In another embodiment, the rubber composition comprises from 90 phr to 100 phr of the at least one partially saturated elastomer and from 0 phr to 10 phr of the diene based elastomer. Alternatively, the rubber composition comprises from 95 phr to 100 phr of the at least one partially saturated elastomer and from 0 phr to 5 phr of the diene based elastomer.

In yet another embodiment, said filler comprises from 40 phr to 190 phr of silica and/or predominantly silica.

In yet another embodiment, said filler comprises from 105 phr to 190 phr of silica.

In still another embodiment, said filler comprises from 40 phr to 90 phr of silica.

In still another embodiment, said filler comprises from 70 phr to 120 phr of silica.

In still another embodiment, the hydrogenated hydrocarbon resin is free of double bonds. Such a highly hydrogenated hydrocarbon resin is even more compatible with the rubber matrix according to the present invention.

In one embodiment of this invention, the hydrogenated hydrocarbon resin comprises multiple, preferably different, monomer residues, wherein the majority of said monomer residues are aliphatic residues, and wherein said aliphatic residues are free of double bonds. In one specific embodiment, the remaining monomer residues can be aromatic or comprise aromatic groups. In particular, such groups could be present if the resin is modified with aromatic groups. Some examples of aliphatic monomers include C5 monomers, cyclopentadiene monomers, and dicyclopentadiene monomers. Hydrogenation can render the monomer residues of such aliphatic monomers free of double bonds. Aromatic monomers can for instance comprise C9 monomers.

In still another embodiment, the partially saturated elastomer comprises repeat units formed by (or consisting of) residues of monomers selected from ethylene, propylene, butylene, butadiene, isoprene, and styrene. These monomers are preferably used to make or obtain the partially saturated elastomer. One or more of the residues may be hydrogenated. In other words, double bonds of one or more of the residues may be hydrogenated.

In yet another embodiment, the partially saturated elastomer is a hydrogenated styrene-butadiene rubber, preferably a hydrogenated solution-polymerized styrene-butadiene rubber (SSBR). Hydrogenated SSBR and its manufacturing as such is known to the person skilled in the art and is for instance described in United States Patent Application Publications US2018201065 A1, US2018251576 A1 and US20190062539 A1.

In still another embodiment, the rubber composition further comprises from 3 phr to 20 phr (preferably from 5 phr to 15 phr) of a polyoctenamer. Addition of polyoctenamer helps to further improve tensile properties and also the co-curability to other diene based elastomeric compounds. Moreover, the presence of the polyoctenamer helps to improve rolling resistance indicators in combination with the partially saturated elastomer such as a hydrogenated SSBR.

In another preferred embodiment, the polyoctenamer has one or more of: a glass transition temperature within a range of −50° C. to −80° C., determined under ASTM D3418 as mentioned hereinbelow; a weight average molecular weight $M_W$ within a range of 80,000 g/mol to 100,000 g/mol, determined by gel permeation chromatography (GPC) using polystyrene calibration standards according to ASTM 5296-11 or equivalent; and a melting point within a range of 45° C. to 55° C., measured by DSC in second heating, according to ASTM D3418 or equivalent.

In yet another preferred embodiment, the polyoctenamer has between 65% and 85% of trans double bonds of all double bonds in the polyoctenamer.

In yet another embodiment, the rubber composition comprises 80 phr to 100 phr of the partially saturated elastomer, 0 phr to 20 phr of polybutadiene, and optionally 5 phr to 45 phr of the hydrogenated hydrocarbon resin. In particular, the partially saturated elastomer may also be the hydrogenated styrene butadiene rubber as mentioned herein.

In still another embodiment, said polybutadiene has a glass transition temperature within a range of −90° C. to −115° C. and/or is a (high) cis-1,4-polybutadiene rubber having a cis-microstructure content of at least 95%. Preferably, the rubber composition comprises from 80 phr to 95 phr of the partially saturated polymer and 5 phr to 20 phr of the polybutadiene.

In still another embodiment, the partially saturated elastomer has a glass transition temperature in a range of −20° C. to −60° C., preferably in a range of −20° C. to −45° C., or even more preferably in a range of −25° C. to −40° C.

In still another embodiment, the partially saturated elastomer is a styrene-butadiene rubber, such as a partially saturated solution-polymerized styrene butadiene rubber, having one or more of:

i) less than 5% of non-hydrogenated vinyl groups, based on the total number of vinyl groups of the hydrogenated styrene butadiene rubber;

ii) less than 20%, preferably less than 10%, or preferably less than 5%, of non-hydrogenated double bonds in cis-1,4 and trans-1,4 butadiene repeat units, based on the total number of cis-1,4 and trans-1,4 butadiene repeat units;

iii) from 80%, preferably from 85% or from 90%, to 99% of hydrogenated double bonds;

iv) a bound styrene content ranging from 5% to 40%, preferably from 20% to 35%, and a butadiene content ranging from 50% to 95%, or from 50% to 80%, by weight; and v) a glass transition temperature within a range of −20° C. to −60° C.

In another preferred embodiment, the hydrogenated styrene-butadiene rubber has from 90% to 98% of hydrogenated double bonds. In other words, there are still double bonds remaining which have not been hydrogenated. As known to the person skilled in the art, the number of double bonds can be determined by NMR. This applies also to other partially saturated elastomers in addition to styrene-butadiene rubbers.

In yet another embodiment, the bound styrene content of the styrene-butadiene rubber will be within the range of 10% to 40% and its bound butadiene content will be within the range of 60% to 90%, by weight, as determined by NMR. The styrene-butadiene rubber will typically have a bound styrene content which is within the range of 20% to 35% and a bound butadiene content which is within the range of 65% to 80%.

In yet another embodiment, the rubber composition comprises between 0 phr and 30 phr of oil, or from 5 phr to 30 phr of oil, or preferably from 10 phr to 25 phr of oil.

In still another embodiment, the oil has a glass transition temperature within a range of −45° C. to −85° C. The glass transition temperature of an oil is determined as a peak midpoint by a differential scanning calorimeter (DSC) at a temperature rate of increase of 10° C. per minute, according to ASTM E1356 or equivalent.

In still another embodiment, the oil is selected from one or more of paraffinic oils, aromatic oils, and naphthenic oils.

In yet another embodiment, the rubber composition has a resin to oil ratio within a range of 4:1 to 1:2, preferably within a range of 3:1 to 1:1.5, or even more preferably within a range of 2:1 to 1:1.5.

In still another embodiment, the rubber composition further comprises at least 0.2 phr of vulcanizing agents, preferably comprising elemental sulfur. For instance the composition may comprise from 0.4 phr to 15 phr of vulcanizing agents which may comprise, but are not limited to, elemental sulfur or sulfur containing silanes.

In another embodiment, the rubber composition comprises from 0.3 phr to 3 phr of at least one vulcanization accelerator selected from the dithiocarbamate accelerators and/or thiuram accelerators. Such accelerators are known to be fast accelerators and are herein considered as particularly beneficial in view of the utilization of the limited amounts of double bonds in the elastomer and/or hydrogenated resin.

In still another embodiment, said vulcanization accelerator is tetrabenzylthiuramdisulfide which has turned out to be a preferred choice in combination with the present type of elastomer and resin.

In an embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. In some embodiments, the partially saturated elastomer may also be a diene-based polymer.

In another embodiment, an emulsion polymerization derived styrene/butadiene (ESBR) used can have a bound styrene content of 20 to 35 percent, or for some applications, an ESBR having a medium to relatively high bound styrene content, namely a bound styrene content of 30 to 45 percent. Emulsion polymerization prepared styrene-butadiene rubber (ESBR) is synthesized by the copolymerization of styrene and 1,3-butadiene in an aqueous emulsion. Emulsion styrene-butadiene rubber and its synthesis in a aqueous emulsion system is well known to persons skilled in the art. The bound styrene content can vary, for example, from 5 to 50 percent. In one embodiment of this invention a terpolymer of styrene, 1,3-butadiene, and acrylonitrile (a nitrile rubber) can be used. It can also be synthesized by in an aqueous medium using well know emulsion polymerization techniques and can contain from 2 to 30 weight percent bound acrylonitrile. Emulsion polymerization prepared styrene/butadiene/acrylonitrile terpolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in the range of 5 to 50 percent, preferably 9 to 36, percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator.

In one embodiment, a synthetic or natural polyisoprene rubber may be used. Synthetic cis 1,4-polyisoprene and cis 1,4-polyisoprene natural rubber are as such well known to those having skill in the rubber art. In particular, the cis 1,4-content may be at least 90%, optionally at least 95%.

In one embodiment, cis 1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis 1,4-content ("high cis" content) and a glass transition temperature (Tg) in a range of from −95° C. to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646.

A glass transition temperature, or Tg, of an elastomer or elastomer composition, where referred to herein, represents the glass transition temperature(s) of the respective elastomer or elastomer composition in its uncured state or possibly a cured state in the case of an elastomer composition. A Tg is determined as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5, preferably less than 3, phr of an additional diene-based rubber or be also essentially free of such an additional diene-based rubber. The terms "compound" and "composition" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area as measured using nitrogen gas. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300. A conventional silica might be expected to have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc.; and silicas available from Evonik AG with, for example, designations VN2 and Ultrasil 6000GR, 9100GR, etc.

In an embodiment, the rubber composition may include also carbon black as one of the filler materials. Preferred amounts in this application range from 1 phr to 60 phr, preferably from 1 phr to 10 phr or from 1 phr to 5 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 $cm^3/100$ g to 150 $cm^3/100$ g.

In another embodiment, other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534, 6,207,757, 6,133,364, 6,372,857, 5,395,891 or 6,127,488, and a plasticized starch composite filler including but not limited to that disclosed in U.S. Pat. No. 5,672,639. Such other fillers may be used in an amount ranging from 1 phr to 10 phr.

In one embodiment, the rubber composition may contain a conventional sulfur containing organosilicon compounds or silanes. Examples of suitable sulfur containing organosilicon compounds are of the formula:

$$Z\text{-Alk-}S_n\text{-Alk-}Z \qquad \text{I}$$

in which Z is selected from the group consisting of

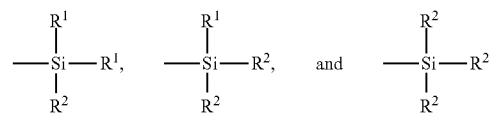

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

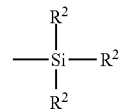

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Publication No.

2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders, and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature which is within the range of 140° C. to 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire (or in other words tire components). For example, the rubber component may be a tread (including tread cap and tread base), sidewall, apex, chafer, sidewall insert, wirecoat or innerliner. However, tread rubber applications are the preferred applications for the present invention.

In a second aspect of the present invention, a tire is provided, in particular comprising a rubber composition in accordance with the first aspect of the invention and/or one of its embodiments. The tire may be an uncured tire or cured tire, i.e. a vulcanized tire.

In a preferred embodiment, a tire comprises a tread cap comprising the rubber composition. In one embodiment, the tire has a radially outer tread cap layer, intended to come into contact with the road when driving, comprising the rubber composition.

In another embodiment, the tire has a radially outer tread cap layer and a radially inner tread cap layer, wherein the radially inner tread cap layer comprises the rubber composition.

The tire of the present invention may for example be a pneumatic tire or nonpneumatic tire, a race tire, a passenger tire, an aircraft tire, an agricultural tire, an earthmover tire, an off-the-road (OTR) tire, a truck tire or a motorcycle tire. The tire may also be a radial or bias tire.

Vulcanization of the pneumatic tire of the present invention may for instance be carried out at conventional temperatures which is within the range of 100° C. to 200° C. In one embodiment, the vulcanization is conducted at temperatures which are within the range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Multiple features of the aspects and embodiments mentioned herein may be combined with one another.

DETAILED DESCRIPTION OF AN EMBODIMENT OF THE INVENTION

Below Table 1 shows different rubber compositions including a partially saturated elastomer in the form of a hydrogenated solution-polymerized styrene butadiene rubber. Examples 1 to 3 are comparative examples, whereas Inventive Examples 1 and 2 are in accordance with non-limiting embodiments of the present invention. Example 1 is essentially resin free whereas the remaining examples comprise 15 phr of resin. As Example 1 is resin free, the other examples comprise a different oil to adjust the compound glass transition temperature essentially to that of Example 1 and so as to improve the comparability of rubber compound properties. Types and amounts of waxes, stearic acid, silica, carbon black, silane, accelerators, processing aids, curing agents and antidegradants are the same or similar in the different Examples.

Examples 2 and 3 comprise an aliphatic C5 resin which is not hydrogenated. In contrast, Inventive Examples 1 and 2 comprise a hydrogenated dicyclopentadiene (DCPD) resin as hydrogenated plasticizer. Examples 1 and 2 as well as Inventive Example 1 further comprise 5 phr of a polyoctenamer.

TABLE 1

| Ingredient | Sample (amounts in phr) | | | | |
| --- | --- | --- | --- | --- | --- |
| | Ex. 1 | Ex. 2 | Ex. 3 | Inv. Ex. 1 | Inv. Ex. 2 |
| Hydrogenated SSBR[1] | 100 | 100 | 100 | 100 | 100 |
| Resin 1[2] | 0 | 0 | 0 | 15 | 15 |
| Resin 2[3] | 0 | 15 | 15 | 0 | 0 |
| Wax | 1.5 | 1.5 | 1.5 | 1.5 | 1.5 |
| Antidegradants | 3 | 3 | 3 | 3 | 3 |
| Polyoctenamer[4] | 5 | 5 | 0 | 5 | 0 |
| Oil 1[5] | 0 | 15 | 15 | 15 | 15 |
| Oil 2[6] | 15 | 0 | 0 | 0 | 0 |
| Stearic Acid | 3 | 3 | 3 | 3 | 3 |
| Silica[7] | 80 | 80 | 80 | 80 | 80 |
| Silane[8] | 8 | 8 | 8 | 8 | 8 |
| Fatty acid soap | 1 | 1 | 1 | 1 | 1 |
| TBzTD[9] | 0.5 | 0.7 | 0.7 | 0.7 | 0.7 |
| Zinc Oxide | 2.5 | 2.5 | 2.5 | 2.5 | 2.5 |
| Sulfur | 1.1 | 1.4 | 1.4 | 1.4 | 1.4 |
| MBT[10] | 0.2 | 0.2 | 0.2 | 0.2 | 0.2 |
| CBS[11] | 2.5 | 2.5 | 2.5 | 2.5 | 2.5 |
| DPG[12] | 2.9 | 2.9 | 2.9 | 2.9 | 2.9 |
| Carbon Black | 2 | 2 | 2 | 2 | 2 |

[1]Hydrogenated solution-polymerized styrene butadiene rubber having a glass transition temperature of about −30° C.
[2]Hydrogenated dicyclopentadiene resin as Oppera ™ PR-140 from Exxonmobil
[3]C5 resin as Wingtack ™ 98 from Cray Valley
[4]Vestenamer ™ 8012 of the company Evonik
[5]Naphtenic oil having a glass transition temperature of −77° C.
[6]TDAE oil having a glass transition temperature of −50° C.
[7]HDS Silica having a BET surface area of 215 m²/g
[8]Bis-triethoxysilylpropyl-disulfide as SI 266 ™ of the company Evonik
[9]Vulcanizing accelerator tetrabenzylthiuram disulfide
[10]Vulcanizing agent mercaptobenzothiazole
[11]Vulcanizing accelerator N-cyclohexyl-benzothiazolesulfenamide
[12]Vulcanizing accelerator diphenylguanidine Measurements of physical properties have been carried out for Examples 1 to 3 as well as for Inventive Examples 1 and 2. Corresponding results are summarized in Table 2 hereinbelow. Remarkably, the use of the hydrogenated hydrocarbon resin of Inventive Examples 1 and 2 improves significantly the rolling resistance indicator Tangent Delta at 30° C. In particular, comparing Example 3 with Inventive Example 2 shows an improvement in the order of 5%. Similarly, comparing versions comprising the polyoctenamer, i.e. Example 2 and Inventive Example, 1 shows an improvement which is even larger (in the order of 10%). While the Tangent Delta Value of Example 1 is even lower than that of Inventive Example 2, it is noted that Example 1 (which is resin free) is significantly worse with regard to the wet traction indicator provided by the rebound resilience measurement at 0° C. which is about 50% worse than the value according to Inventive Example 2. Abrasion values for Example 3 and Inventive Example 2 are at a similar level. The same applies to the two versions with polyoctenamer according to Examples 2 and Inventive Example 1, wherein their abrasion is significantly smaller than that of Example 3 and Inventive Example 2. The tear strength is for all samples of Table 2 at a preferable level which is caused, according to a non-binding theory of the inventors, by the partially saturated elastomer, here included as hydrogenated SSBR. In addition, it is noted that the Inventive Examples 1 and 2 provide an increased stiffness over the compositions of Examples 2 and 3. Although the stiffness of Example 1 is even higher, its rebound at 0° C. is at a level which is less favorable than that of all other examples and indicates inferior wet performance as already mentioned herein above. Thus, the compromise or balance of properties of Examples 2 and 3 is better than that of Example 1. Moreover, the balance of properties of Inventive Examples 1 and 2 is better than for Examples 1 to 3.

TABLE 2

| Test/Property | Ex. 1 | Ex. 2 | Ex. 3 | Inv. Ex. 1 | Inv. Ex. 2 |
| --- | --- | --- | --- | --- | --- |
| G' 30° C. (MPA)[a] | 5.39 | 3.18 | 3.54 | 3.69 | 4.18 |
| Tan Delta 30° C.[b] | 0.180 | 0.175 | 0.195 | 0.155 | 0.185 |
| Rebound 0° C. (%)[c] | 15.5 | 12.8 | 10.7 | 13.0 | 10.6 |
| Abrasion (mm³)[d] | 109 | 120 | 130 | 123 | 128 |
| Tear Strength (N/mm)[e] | 16.7 | 14.2 | 17.1 | 16.6 | 15.3 |

[a]G' has been obtained by a Metravib ™ instrument at 30° C., 6% strain and 7.8 Hz based on DIN 53513, or equivalent.
[b]Tangent Delta has been obtained by a Metravib ™ instrument at 30° C., 6% strain and 7.8 Hz based on DIN 53513, or equivalent.
[c]Rebound measured on a Zwick Roell 5109 rebound resilience tester according to DIN 53512 at given temperature.
[d]Rotary drum abrasion test according to ASTM D5963 or equivalent
[e]Strebler tear strength test according to DIN 53539 or equivalent.

While certain representative embodiments and details have been shown for the purpose of illustrating the subject invention, it will be apparent to those skilled in this art that various changes and modifications can be made therein without departing from the scope of the subject invention.

What is claimed is:

1. A sulfur vulcanizable rubber composition comprising: at least one partially saturated elastomer comprising repeat units, wherein at most 15% of all repeat units of the elastomer comprise a double bond, wherein the partially saturated elastomer has a glass transition temperature which is within the range of −52° C. to −60° C.; wherein the rubber composition comprises from 80 phr to 95 phr of the partially saturated elastomer and from 2 phr to 8 phr of cis-1,4-polybutadiene rubber having a cis-microstructure content of at least 95%, and wherein the polybutadiene rubber has a glass transition temperature within a range of −90° C. to −115° C.; 40 phr to 200 phr of at least one filler; 5 phr to 70 phr of at least one hydrogenated plasticizer; and 3 phr to 20 phr of a polyoctenamer.

2. The sulfur vulcanizable rubber composition according to claim 1, wherein from 4% to 8% of all repeat units in the partially saturated elastomer have a double bond.

3. The sulfur vulcanizable rubber composition according to claim 1, wherein said filler comprises from 40 phr to 190 phr of silica.

4. The sulfur vulcanizable rubber composition according to claim 1, wherein the partially saturated elastomer consists of isoprene repeat units.

5. The sulfur vulcanizable rubber composition according to claim 1, wherein the partially saturated elastomer consists of butadiene repeat units.

6. The sulfur vulcanizable rubber composition according to claim 1, wherein the partially saturated elastomer has:
   a glass transition temperature within a range of −55° C. to −60° C.; and
   a molecular weight within a range of 200,000 g/mol to 500,000 g/mol.

7. The sulfur vulcanizable rubber composition according to claim 1, wherein the rubber composition further comprises an oil at a level of up to 25 phr; and wherein the ratio of the hydrogenated plasticizer to the oil is within a range of 4:1 to 1:2.

8. The sulfur vulcanizable rubber composition according to claim 1, further comprising 0.3 phr to 3 phr of a vulcanization accelerator selected from one or more of dithiocarbamate accelerators and thiuram accelerators.

9. The sulfur vulcanizable rubber composition of claim 1 wherein the hydrogenated plasticizer is a fully hydrogenated cyclopentadiene resin.

10. The sulfur vulcanizable rubber composition of claim 1 wherein the hydrogenated plasticizer is a partially hydrogenated cyclopentadiene resin.

11. The sulfur vulcanizable rubber composition according to claim 1, wherein the polyoctenamer has a glass transition temperature within a range of −50° C. to −80° C.

12. The sulfur vulcanizable rubber composition according to claim 11 wherein the polyoctenamer has a weight average molecular weight within a range of 80,000 to 100,000 g/mol as determined by GPC.

13. The sulfur vulcanizable rubber composition according to claim 11 wherein the polyoctenamer has a melting point within a range of 45° C. to 55° C. as measured by DSC in a second heating.

14. The sulfur vulcanizable rubber composition according to claim 11 wherein the polyoctenamer contains between 65% and 85% trans double bonds.

15. The sulfur vulcanizable rubber composition according to claim 1, wherein the partially saturated elastomer is a solution-polymerized styrene butadiene rubber.

16. The sulfur vulcanizable rubber composition according to claim 15 wherein the solution-polymerized styrene butadiene rubber has a bound styrene content which is with the range of 5% to 40%.

17. The sulfur vulcanizable rubber composition according to claim 15 wherein the solution-polymerized styrene butadiene rubber has a molecular weight within a range of 200,000 g/mol to 500,000 g/mol.

18. The sulfur vulcanizable rubber composition according to claim 15 wherein the solution-polymerized styrene butadiene rubber contains less than 5% non-hydrogenated vinyl groups, based on the total number of vinyl groups of the solution-polymerized styrene butadiene rubber.

19. A tire comprising the sulfur vulcanizable rubber composition of claim 1.

* * * * *